Oct. 15, 1929.　　　H. S. POWELL　　　1,731,540
ENGINE SUPPORT
Filed April 14, 1927　　　4 Sheets-Sheet 1
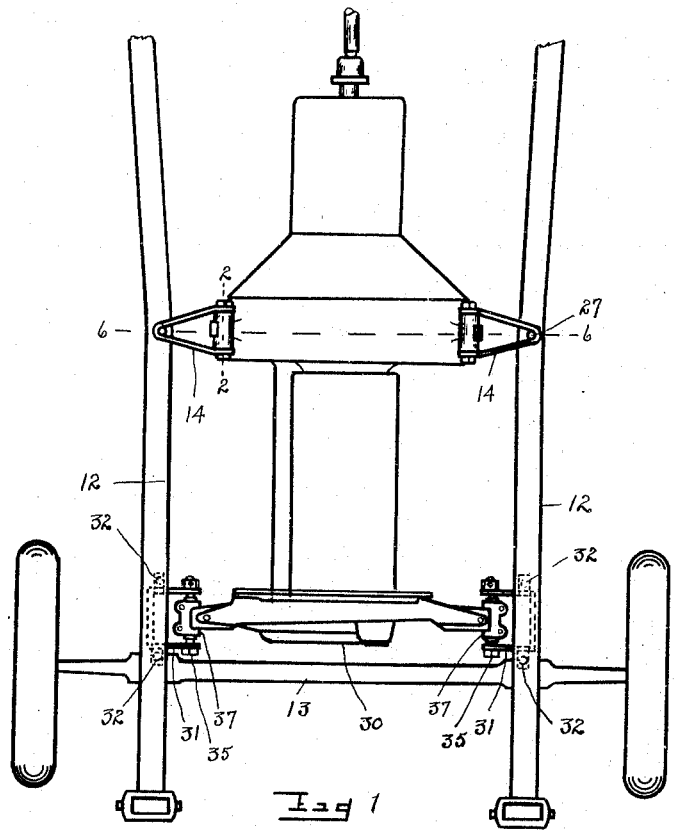
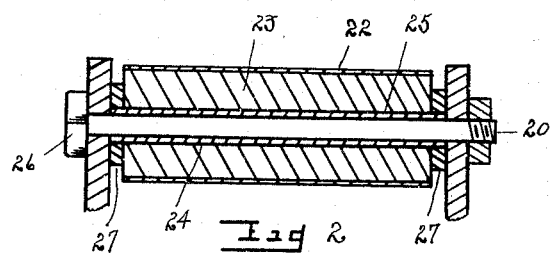
Inventor
Herbert S. Powell
By
Thomas L. Wilder
Attorney

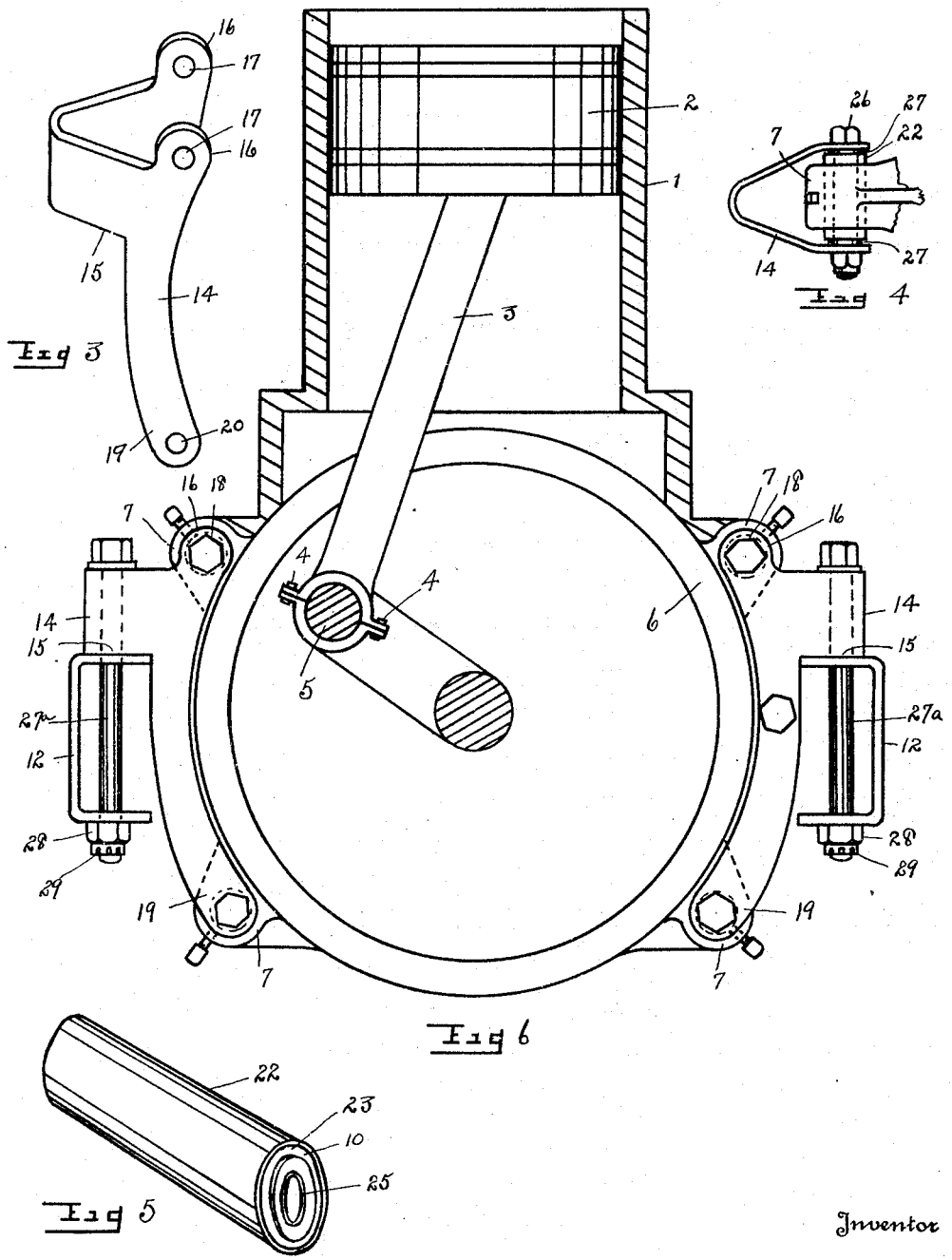

Oct. 15, 1929.    H. S. POWELL    1,731,540
ENGINE SUPPORT
Filed April 14, 1927    4 Sheets-Sheet 3

Inventor
Herbert S. Powell
By Thomas L. Wilder
Attorney

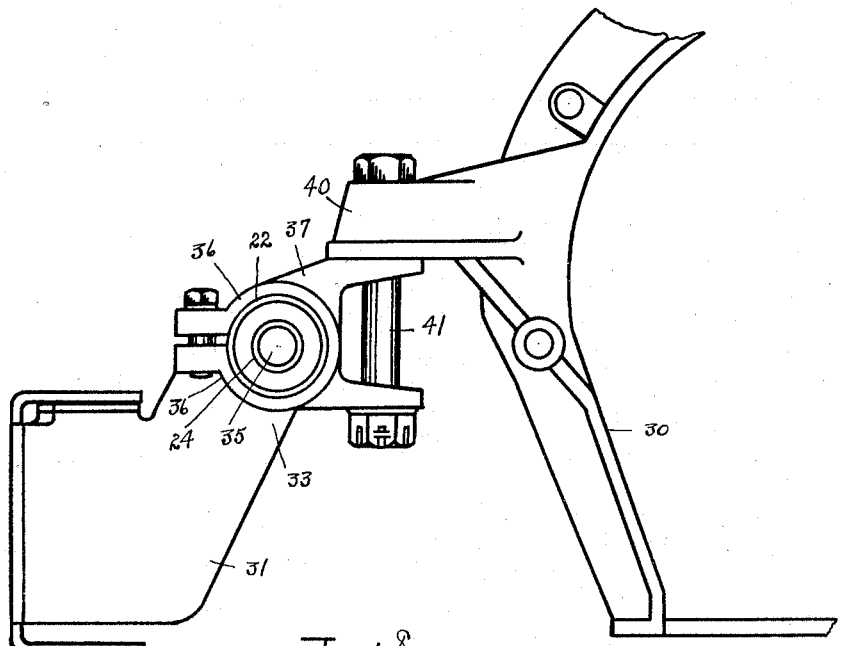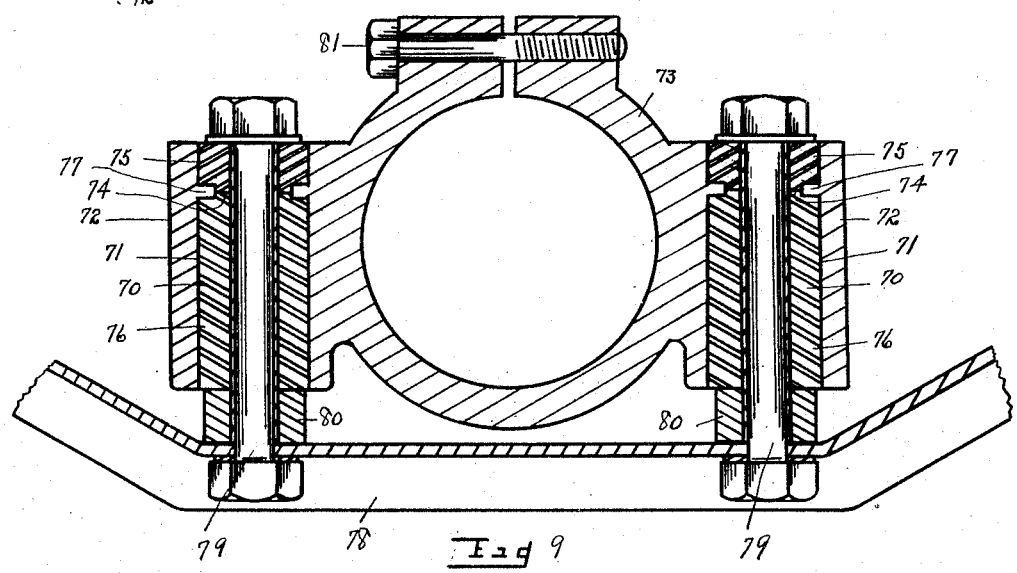

Patented Oct. 15, 1929

1,731,540

UNITED STATES PATENT OFFICE

HERBERT S. POWELL, OF UTICA, NEW YORK

ENGINE SUPPORT

Application filed April 14, 1927. Serial No. 183,874.

My invention relates to an engine support and I declare the following to be full, clear, concise and exact description thereof sufficient to enable anyone skilled in the art to which it appertains to make and use the same, reference being had to the accompanying drawings in which like reference characters refer to like parts throughout the specifications.

The object of the invention is to provide means for supporting an internal combustion engine upon the chassis of the automobile, in such manner as to prevent the transference of any vibration incident to the running of the engine to the chassis of the automobile. Furthermore, the support will prevent the twisting of the side members of the chassis which is a serious objection in supports heretofore made. By thus minimizing the vibration of the engine with respect to the chassis the riding qualities of the automobile will be improved. Moreover, such a support will eliminate the necessity of lubrication and give a flexible connection between the motor and chassis.

The object will be understood by referring to the drawings, in which:

Fig. 1 is a plan view of the device.

Fig. 2 is an enlarged sectional view taken on the line 2, 2 of Fig. 1.

Fig. 3 is an enlarged view showing a perspective of a bracket employed.

Fig. 4 is a detail plan view of the bracket and immediate parts.

Fig. 5 is an enlarged detail view showing a perspective of a cushion joint employed.

Fig. 6 is an enlarged sectional view taken on the line 6—6 of Fig. 1, showing parts in full.

Fig. 8 is an enlarged detail view, parts being broken away, showing an elevation of the cushion joint used in connecting the front part of the engine to the chassis.

Fig. 9 is an enlarged central vertical section of a modified manner of supporting the front part of the engine upon the chassis.

Figure 7:
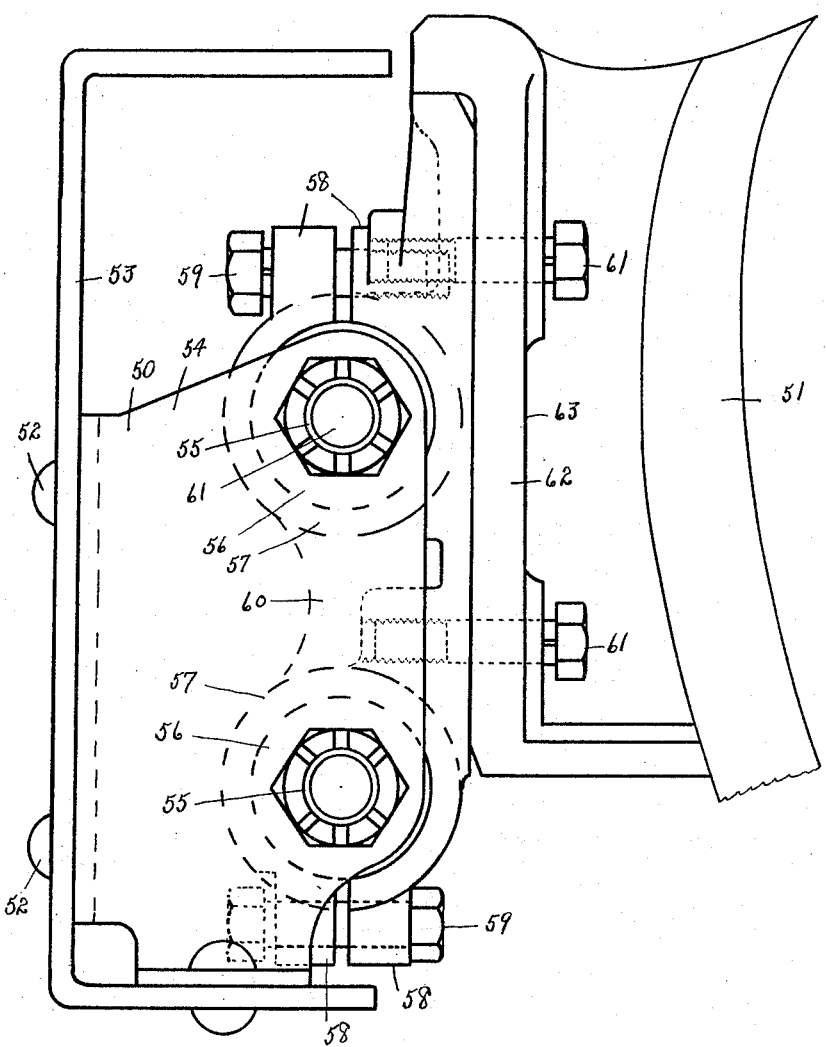
Fig. 7 is an enlarged view showing a side elevation of a modified form of bracket used.

Referring more particularly to the drawings, the device embodies the cylindrical casing 1 in which operates the piston 2 connected to piston rod 3 that is clamped by bolts 4, 4 to turn on crank shaft 5, disposed in crank casing 6.

Crank casing 6 is equipped with lugs or extensions 7 having bolt holes for the disposition of the rubber joints 10.

Extensions 7 are connected to channel bars 12, 12 of the chassis 13 by means of U-shaped brackets 14.

In order to properly support the middle portion of casing 1 upon chassis 13 a bracket 14 is disposed on either side of said casing 1. Each of said U-shaped brackets 14 has a shoulder at 15 adapted to rest upon the upper surface of a channel bar 12, whereby to support themselves and the engine they carry upon the chassis 13. Moreover, each of the brackets 14 has a head part 16 with a bolt hole 17 adapted to aline with one of the bolt holes 18 of upper extensions 7 and a lower depending part 19 with a bolt hole 20 near its lowermost end to aline with a bolt hole of a lower extension 7.

The connections are made by projecting in each instance through the hole of extension 7 a cushion member or rubber joint 10 comprising an outer steel cylinder 22 into which is forced a rubber bushing 23 having a central aperture 24. An inner steel tubing 25 of larger diameter is forced into aperture 24 of smaller diameter in rubber bushing 23, whereby to keep a constant tension of the rubber bushing on inner steel tubing 25 and outer steel cylinder 22. A headed bolt 26 is projected then through the alined holes of bracket 14 and inner steel tubing 25. Metallic washers 27 are mounted on tubing 25 adjacent the ends. Cushion members 21 will eliminate the use of lubrication at said parts. Moreover, it will tend to prevent the vibrations of the engine being transferred to the channel bars 12 of chassis 13 and, thereby, twisting said channel bars 12 with harmful results.

Brackets 14 are held to channel bars 12 by headed bolts 27$^a$ that project down adjacent the connecting part of U shaped brackets 14 into bolt holes in channel bars 12. Nuts 28 are wired at 29 to prevent them from turning loose.

The front part 30 of the engine casing is supported upon channel bars 12 of the chassis by means of U shaped brackets 31, 31 that are bolted at 32, 32 in each instance to said channel bars 12. Brackets 31 in each instance are equipped with upwardly extending members 33, 33 having apertures to carry a bolt 35 that projects through an inner steel tubing 24 forming part of the rubber joint, as heretofore explained.

Outer steel sleeve 22 is carried in clamping members 36, 36 forming part of bracket 37 that is bolted to bracket 40 of the front part 30 of the engine casing by bolt 41.

Fig. 7 shows a modification of the bracket 50 for supporting crank casing 51. Brackets 50 are made in each instance U shaped or channel shaped and are bolted at 52 to bar 53 of the chassis. Apertures are made in the opposite vertical walls 54, 54 of each bracket for carrying sleeves 55, 55 that are projected in each instance through rubber cylinders 56, 56 housed in cylindrical casings 57, 57 which are equipped with clamping parts 58, 58 for the projecting of bolts 59, 59. Casings 57 are made integral with member 60 that is fastened by bolts 61 to bracket 62 adapted to carry engine or crank casing 51. It will be observed that the bed of engine casing 51 will be carried by the chassis through interposition of rubber cylinders 56, whereby to prevent the transference of the vibrations of the engine to the chassis.

Fig. 9 shows a still further modification whereby the cushion or rubber joints are disposed in vertical position instead of a horizontal position as described above. Cushion members 70 are disposed in apertures 71 formed in brackets 72, 72 made integral with ring 73. In this instance, however, each of the cushion members 70 is divided at 74 into two parts an upper 75 and a lower 76. The upper part 75 is shorter in length than the lower 76. This division of cushion members 70 is made necessary to assemble the same within the apertures 71 because of the projection into said apertures 71 of annular rings 77. Rings 77 are made integral with the walls of brackets 72 and are intended to aid in preventing cushion members 70 from moving or creeping longitudinally. Ring 73 is adapted to be clamped about the forward annular projecting part of the engine, not shown. Moreover, brackets 72 are fastened to the front cross member 78 of the chassis of the automobile by bolts 79, 79. Steel bushings 80, 80 are disposed between the upper surface of beam 77 and the under surface of brackets 72. Bolts 79 pass through said bushings 80. Bolt 81 is screw threaded to other of ring 73 whereby to clamp said ring about the forward annular projecting part of the engine, not shown.

Having thus described my invention what I claim as new and desire to secure by Letters Patent is as follows:

In an engine support, a engine casing, a chassis, a bracket attached to said chassis, bolts carried by said bracket, tubes of predetermined diameter mounted on said bolts, cylindrical cushions having a central aperture smaller than the diameter of said tube mounted on said bolts, whereby said cushion members will not creep with respect to said tubes, and a member for attaching said engine casing to said cushion member, whereby to prevent the twisting of said chassis.

In testimony whereof I have affixed my signature.

HERBERT S. POWELL.